Dec. 18, 1956 H. LOWER 2,774,624
OPERATING AND LATCHING MECHANISM FOR A VEHICLE SLIDING ROOF
Filed June 30, 1954 6 Sheets-Sheet 1

INVENTOR.
Helmut Lower
BY

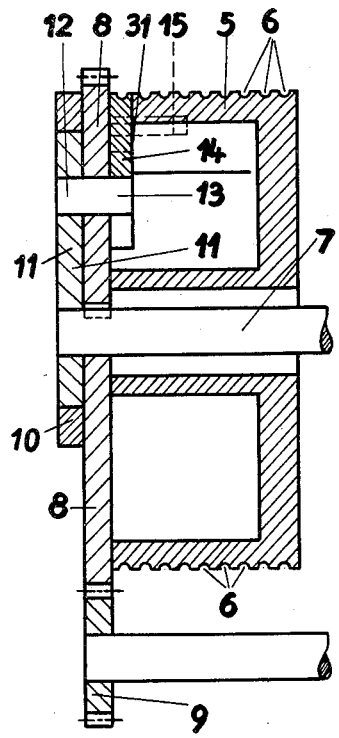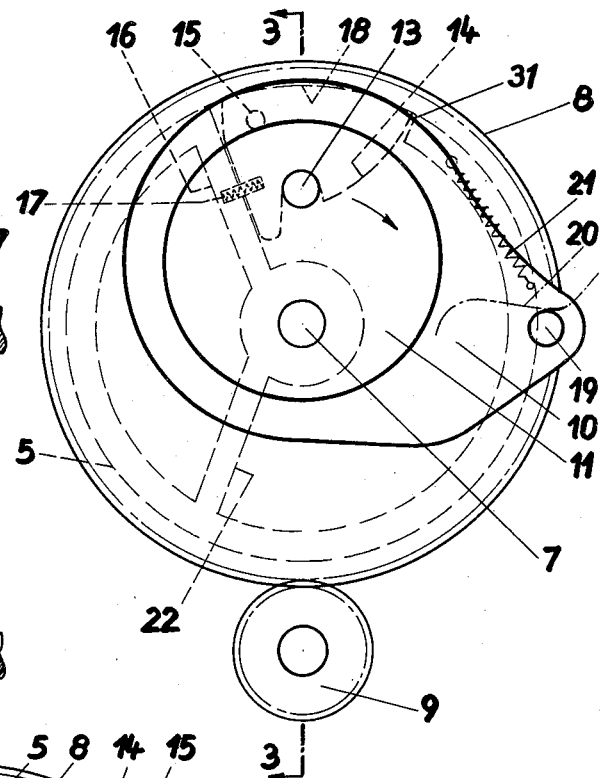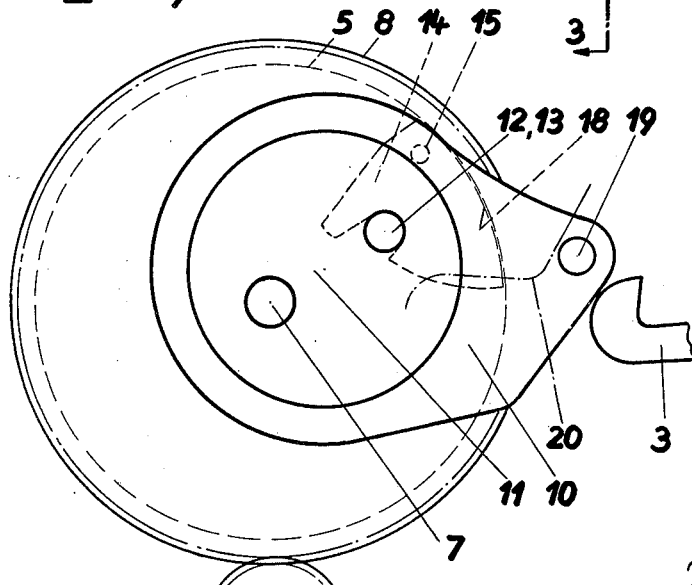

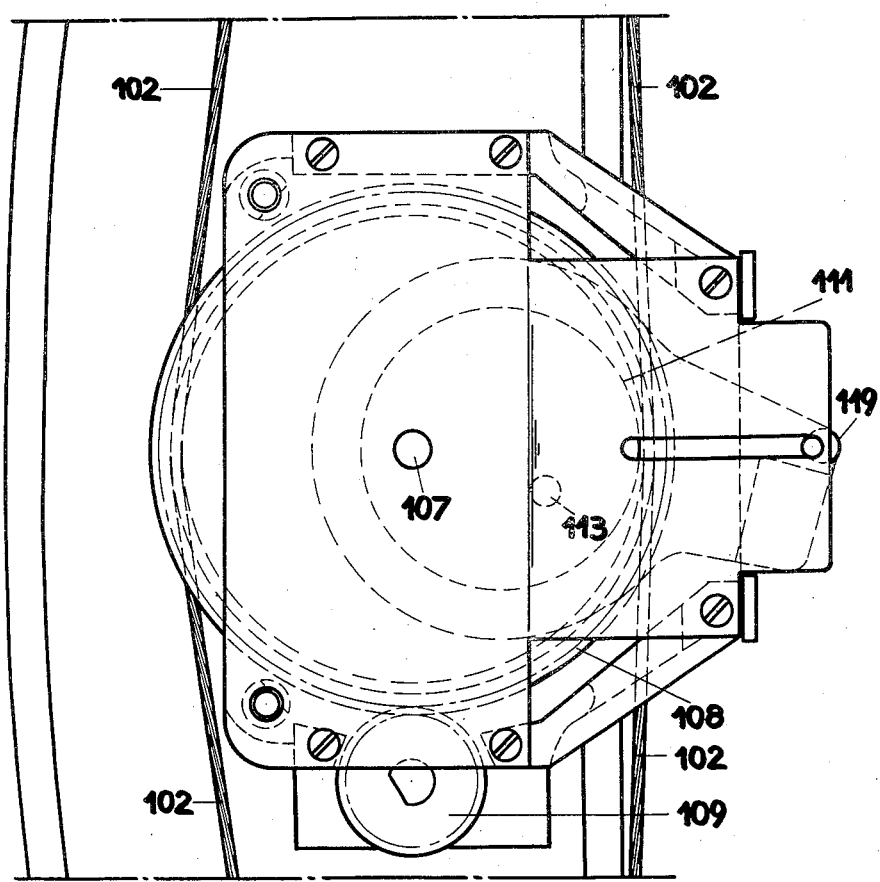

Dec. 18, 1956   H. LOWER   2,774,624
OPERATING AND LATCHING MECHANISM FOR A VEHICLE SLIDING ROOF
Filed June 30, 1954   6 Sheets-Sheet 5

INVENTOR.

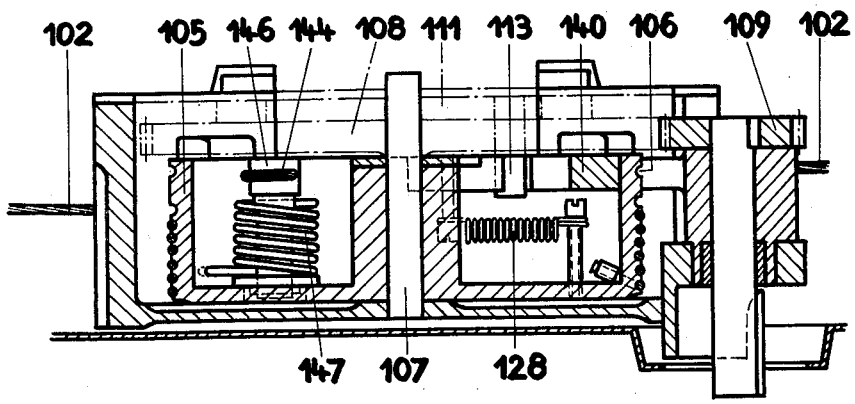
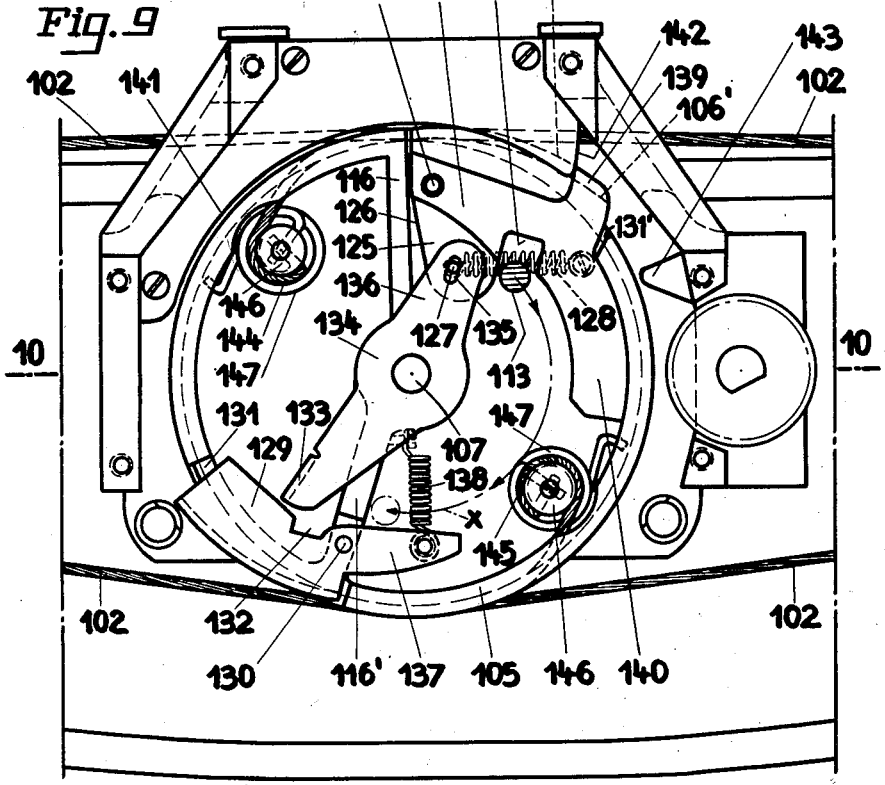

United States Patent Office 2,774,624
Patented Dec. 18, 1956

2,774,624

OPERATING AND LATCHING MECHANISM FOR A VEHICLE SLIDING ROOF

Helmut Lower, Wuppertal-Elberfeld, Germany, assignor to Firma Gebr. Happich G. m. b. H., Wuppertal-Elberfeld, Germany, a corporation of Germany Application June 30, 1954, Serial No. 440,497

Claims priority, application Germany June 30, 1953

8 Claims. (Cl. 296—137)

The present invention relates to a closing device for a sliding roof of a top particularly for vehicles, in which the sliding roof is moved or drawn by means of a rope or cable wound on a driven drum.

It is one object of the present invention to provide a closing device for rope or cable driven sliding roofs for vehicles which comprises means for forcibly pulling the front hoop of the sliding roof by means of a closing hook, which means include an eccentric cooperating with said closing hook at the end of the closing movement of the sliding roof without interference with the cable drive, in order to bring about a tight seal between the front hoop of the sliding roof and the cross-beam of the roof.

It is another object of the present invention to provide a closing device for rope or cable driven sliding roofs for vehicles which comprises a steadily moved member performing a long stroke and a progressively moved member performing a short stroke, both members being combined and driven commonly in such manner that the effects overlap, and automatically operating control means for releasing the cable from the drive during the stroke of an eccentric, in order to remove the braking force of the cable drive, thereby achieving an easy operation, so that small motors may be used.

It is still another object of the present invention to provide a closing device for rope or cable driven sliding roofs for vehicles which comprises a cable drum and a pulling member for the closing hook of the sliding roof and a coupling member disposed between the cable drum and the pulling member, which coupling member releases the drive for the cable drum upon freeing the movement of the coupling member due to the unwinding of the cable from the drum.

It is yet another object of the present invention to provide a closing device for rope or cable driven sliding roofs for vehicles which comprises a disk and an eccentric mounted on the drive gear for the cable drum, and the eccentric carries on its arm a catch bolt engaging a guide face and cooperating with a hook secured to the front hoop of the sliding roof.

It is also another object of the present invention to provide a closing device for rope or cable driven sliding roofs for vehicles which comprises a simple, forcibly operating and cable controlled coupling device consisting of a swingable and spring biased coupling lever mounted in the cable drum, the back of the said coupling lever closing a slot in the drum which slot is of a width equal with that of a cable groove, and which coupling lever is provided with a coupling hook which grips a coupling bolt secured to the drive-gear.

It is still a further object of the present invention to provide a closing device for rope or cable driven sliding roofs for vehicles which comprises locking means for the coupling device during a possible immovability of the sliding roof, so that the coupling lever which receives the coupling bolt could be freed due to a slackness in the cable, which locking means consists of a locking member mounted in the cable drum and controlling the coupling member which is operated by the cable winding movement.

With these and other objects in view, which will become apparent in the following detailed description, the present invention will be clearly understood in connection with the accompanying drawings, in which:

Fig. 2 is a plan view of the closing device, the drive being shown, however, schematically only;

Fig. 3 is a section along the lines 3—3 of Fig. 2;

Fig. 4 is a schematic view of the pulling elements just before disengagement of the cable drum;

Fig. 7 is a plan view of another embodiment of the drive with the coupling lever;

Fig. 8 is a plan view of the drive shown in Fig. 7 after removal of the closing hook and of the drive gear, that means with the cable drum and the coupling device in operative position;

Fig. 9 is a plan view corresponding with that of Fig. 8, yet the coupling device being shown in inoperative position; and Fig. 10 is a section along the lines 10—10 of Fig. 9.

Figure 1:
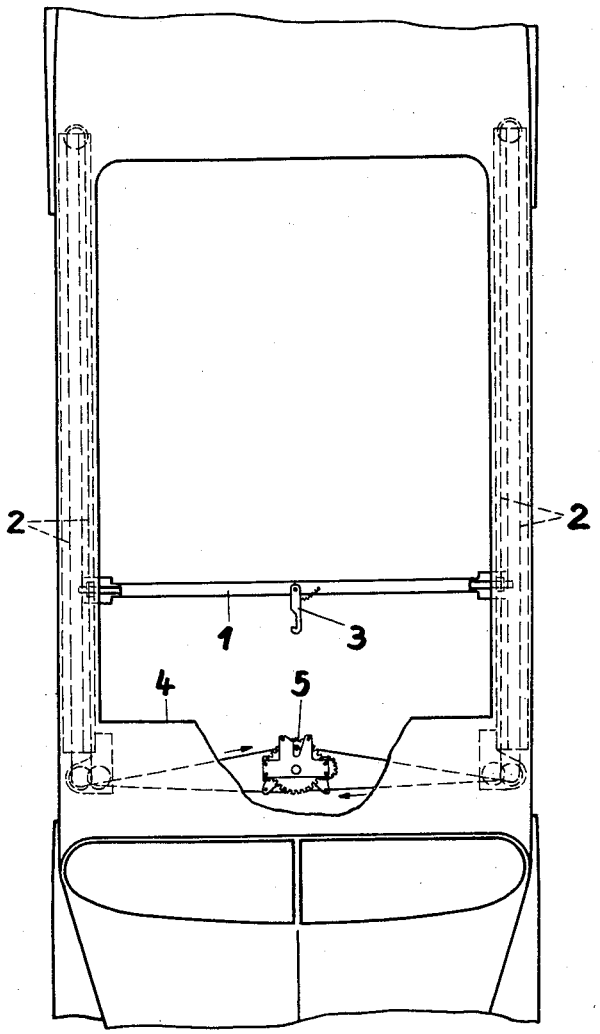
Figure 1 is a plan view of the sliding roof for a vehicle with the closing device designed in accordance with the present invention.

Referring now to the drawings, and in particular to Figs. 1 to 6, the present closing device comprises a front hoop 1 of a sliding roof, which hoop 1 is operated by means of the cable 2 and carries a hook 3. The latter may be covered for esthetic reasons and may be retained in the shown position by resilient means or the like (not shown).

A cable drum 5 equipped with a proper closing device is mounted on the cross-beam 4 of the roof opposite the hook 3.

The cable 2 is wound in several windings back and forth on the cable drum 5. The latter has for this purpose a plurality of grooves 6 on its circumference. The cable drum 5 is freely rotatable on the axle 7 to which a drive gear 8 is keyed. The drive gear 8 meshes a pinion 9 which in turn may be driven by any conventional drive means available in a vehicle. An eccentric 10 is mounted on the drive gear 8 which eccentric 10 is likewise freely rotatable on the axle 7 together with the inner disk 11. The latter is pinned to the drive gear 8 by means of the bolt 12. The bolt 12 extends beyond the opposite face of the drive gear 8 as coupling bolt 13, which is received by a corresponding hook-shaped recess of a coupling lever 14. The cable drum 5 is in this position in turning connection with the drive gear 8 by means of the coupling bolt 13 and the coupling lever 14.

The coupling lever 14 is rotatably mounted on the bolt 15 which projects from the body of the cable drum 5 and the coupling lever 14 abuts in its end position a rib 16 of the drum 5 (Fig. 2). A helical spring 17, disposed between the rib 16 and the coupling lever 14, tends to push the back 18 of the coupling lever 14 through the periphery of the drum 5. The latter has for this purpose a slot 31 opposite the back 18 of the coupling lever 14, which slot 31 has a width substantially equal with that of a cable groove in the drum 5.

If the cable 2 is unwound to the extent, that the slotted cable groove becomes free, the back 18 of the coupling lever 14 projects through the periphery of the drum 5 (Fig. 5) and, thereby, releases the coupling bolt 13, so that from that moment the eccentric 10 only turns with the drive gear 8. At the same time the hook 3 has been advanced so far, that the catch bolt 19, mounted on an arm of the eccentric 10, grips the hook 3.

The catch bolt 19 is moved along a guide 20 which may be secured for instance to a cover plate (not shown) or the like. A spring 21 tends to maintain the catch bolt 19 in engaging position with the guide 20.

Figure 5:
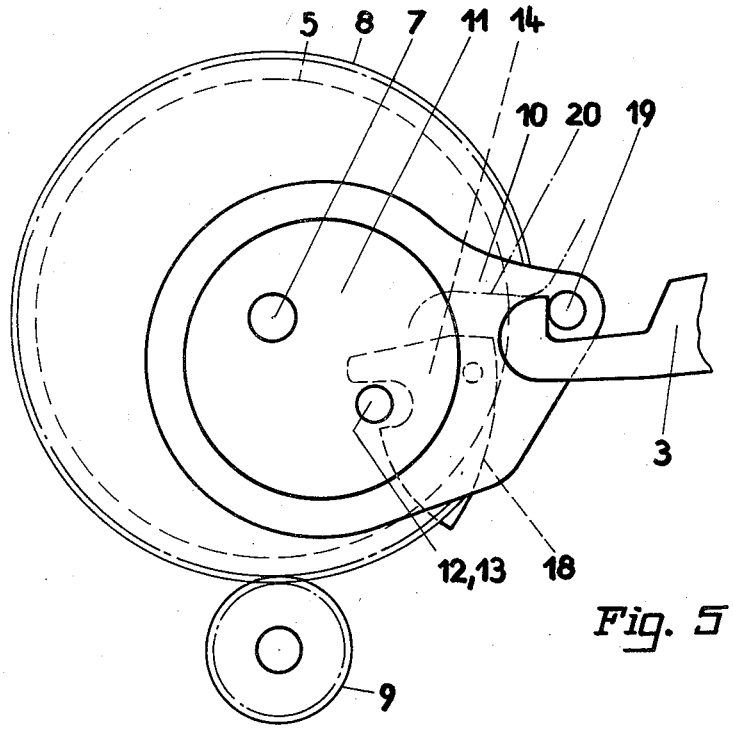
Fig. 5 is a schematic view of the pulling elements at the moment of disengagement of the cable drum.
Figure 6:
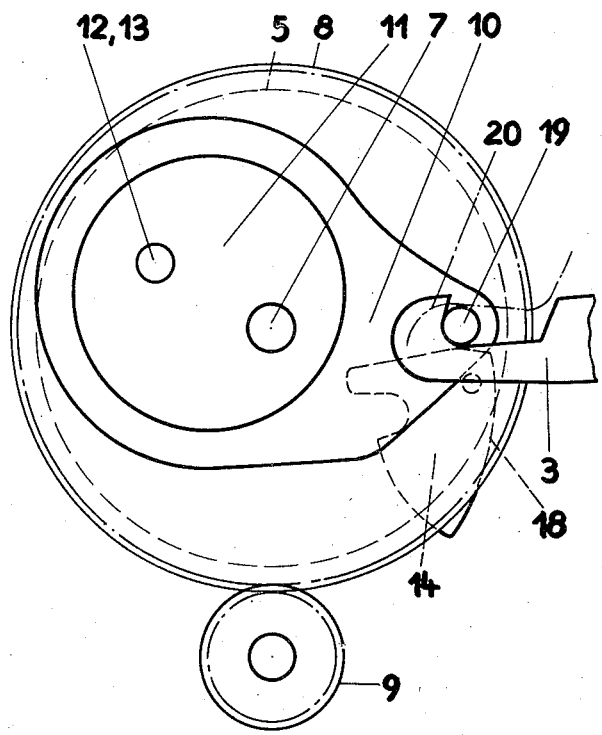
Fig. 6 is a schematic view of the pulling elements in the closing position.
Figure 5:
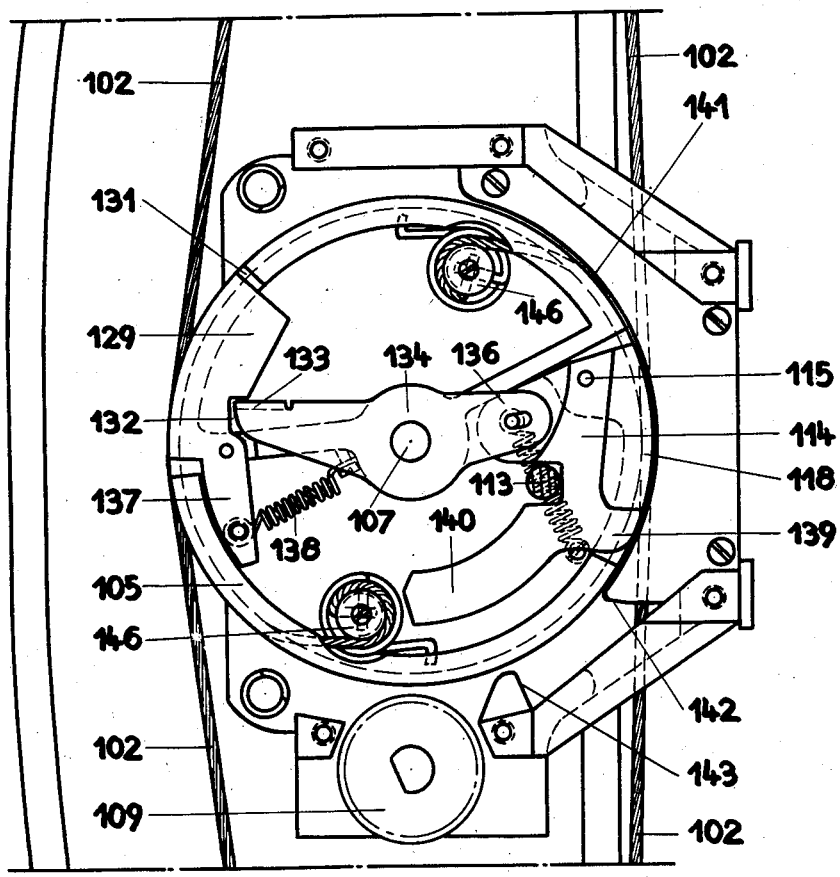

If the eccentric 10 is turned from its position shown in Fig. 5 into that shown in Fig. 6, the coupling bolt 13 moves freely inside of the drum 5 until it abuts the rib 22 of the drum 5. In this position, a dead joint has been passed, due to a knee-lever action between the catch bolt 19, the axle 7 and the bolt 12, 13.

Referring now to Figs. 7 to 10, which disclose a second embodiment of the present invention, the drum 105, which is freely rotatable on the axle 107 and on which the cable 102 is wound, is covered on its top by the drive gear 108, which meshes and is driven by the pinion 109, which in turn may be driven by any conventional means available in vehicles. Upon turning the drive gear 108, the eccentric disk 111 with the catch bolt 119 is moved simultaneously. The coupling device, which is operated by the cable, is disposed between the cable drum 105 and the eccentric 111. The coupling device comprises a swingable coupling lever 114 which is pivoted upon the bolt 115 mounted on the drum body, and the back 118 of the coupling lever 114 is recevied by a slot 131' provided in the drum wall, which slot 131' has a width substantially equal with that of a cable groove of the drum, and the back 118 is equipped with a cable groove 106' which is a continuation of the last groove of the spirally arranged cable grooves 106.

The coupling lever 114 has a notch 124, which receives the coupling bolt 113. The coupling lever 114 has further an inwardly directed arm 125 the edge 126 of which serves as abutment with the rib 116 of the drum 105 in one direction of movement. The arm 125 carries a pin 127 to which one end of a spring 128 is secured, which spring 128 operates as bias means for the coupling lever 114 in its outward movement.

The coupling lever 114 is further controlled by a locking member 129. The latter comprises a tongue member rotatably mounted on the pin 130 of the drum 105 and disposed diametrically opposite to the coupling lever 114. The back of the tongue is received by a slot 131 provided in a wall of the drum 105 which slot 131 is of a width equal to that of a cable groove in the periphery of the drum 105 and only upon passing through the slot 131 will the locking member 129 release the coupling lever 114.

The locking member 129 has for this purpose a notch 132 which receives one end 133 of a double-armed lever 134 which is turnably mounted upon the axle 107, while its other end 136 receives in a longitudinal slot 135 the pin 127 and is connected with the coupling lever 114 by a knee-joint. The locking member 129 has also a counter arm 137 to which one end of a draw spring 138 is secured and which turns the other arm of the locking member 129 through the slot 131 of the drum 105 upon unwinding of the cable 102 from the particular groove.

The coupling lever 114 has also a hook-shaped projection 139 and extends beyond the said projection 139 in the form of a guide member 140, the outer edge of which engages the drum wall in the inoperative position of the coupling device, while its inner curved edge operates as a guide for the coupling bolt 113.

The housing for the drive carries a guide member 141 in order to prevent an involuntary removal of the projection 139. A permanently secured abutment member 143 is also provided within the path of the projection 139 spaced apart from the controlling edge 142 of the guide member 141.

The ends 144 and 145, respectively, of the cable 102, which engage the back 118 of the coupling lever 114 as well as the back of the locking member 129, are disposed within the drum 105 on turnably mounted bolts 146 for securing the cables thereto, which bolts 146 are under influence of a precharged torsion spring 147. In this manner, the cables are maintained in stressed position even in their unwound end position.

The device which is disclosed in Figs. 7 to 10 operates in the following manner:

The cables 102 secured to the front hoop of the roof move the sliding roof into its forward, closing position after the cable drum 105 has performed several revolutions. The cable 102 is unwound during this movement on the cable drum 105 while rising against the coupling lever 114. Upon winding of the last portion of the cable 102, the head of the closing hook, which is mounted on the front hoop of the roof, reached the path of the catch bolt 119, which assumes the position shown in Fig. 7. The elements of the coupling device assume the positions shown in Fig. 8 during the turning movement. The coupling bolt 113 is disposed in the notch 124 of the coupling lever and transfers the turning force of the drive gear 108 to the cable drum 105 by means of the coupling lever 114.

If, upon continued turning of the cable drum 105, the ends of the cable 102 free the locking member 129 and the diametrically oppositely disposed coupling lever 114, at first the locking member 129 swings through the corresponding slot of the drum 105 due to the pressure of the spring 138 in outward direction (Fig. 9). The end 133 of the double-armed lever 134 looses, thereby, its engagement with the notch 132 of the locking member 129 and is consequently turned under pressure of the spring 128. The coupling lever 114 swings at the same time outwardly upon its bolt 115, so that the projection 139 extends beyond the periphery of the cable drum 105. By this movement the coupling bolt 113 is released and moves along the path $x$ until it abuts the rib $116^1$ of the cable drum 105, without yet to drive the latter. The drum 105 is rather locked against rotation in view of engagement of the projection 139 on the abutment member 143 of the housing.

The free turning of the drive gear 108 from the moment of engagement of the projection 139 on the abutment 143 to the moment of engagement of the coupling bolt 113 on the rib $116^1$ of the drum 105 brings about the pull of the sliding roof by means of the eccentric 111 only; the latter is, thereby, moved slightly beyond its rear dead point, in order to achieve a self locking of the pulling movement. The coupling bolt 113 abuts in this position the rib 116', while the drum 105 abuts the housing by means of the projection 139.

The return movement of the sliding roof is started by turning the drive gear 108 in opposite direction. In this case the coupling bolt 113 moves along the path $x$, yet this time in opposite direction, against the coupling lever 114, until it assumes again the position shown in Fig. 9. In order to prevent that the sliding roof is withdrawn involuntarily due to the tension created in the fabric or due to wind pressure during travel, a controlling edge 142 is provided for the projection 139, on which the latter abuts and secures the drum 105 in its position. Only upon continued movement of the coupling bolt 113 due to continued turning of the drive gear 108, the coupling bolt 113 swings the coupling lever 114 inwardly due to engagement with the arm 125 of the coupling lever 114, until the edge 126 of the arm 125 engages the rib 116 of the drum 105. The projection 139 is, thereby, withdrawn into the drum 105, and the double-armed lever 134 returns likewise into its locking position.

The continued rotation of the drive gear 108 causes then the turning of the cable drum 105 by means of the bolt 113, and the further movement of the sliding roof is achieved by the cables 102.

The winding cables 102 cover the slots in the wall of the drum 105 opposite the locking member 129 and the coupling lever 114 and the locking member 129 locks, thereby, the double-armed lever 134 and also the coupling lever 114, so that the coupling device is in operative

I claim:

1. A closing device for a sliding roof for a vehicle comprising a hook member secured to the front end of the said roof, a cross beam disposed on top of the said vehicle, the said hook member being adapted to pull the said sliding roof tightly against the said cross beam, a cable drum secured to the said cross beam, a cable wound on the said drum and adapted to open and close, respectively, the said sliding roof upon turning of the said drum, and a driving member for the turning of the said drum, a coupling device disposed between the said drum and the said driving member and controlled by the said cable, said coupling device including means for disconnecting said drum from said driving member, said hook member operatively engaging said driving member simultaneously with the disconnection of said drum from said driving member.

2. The device, as set forth in claim 1, in which the said driving member comprises a drive gear and an eccentric mounted on the said drive gear, the said eccentric having an arm, a catch bolt secured to the said arm, a guide member mounted on the said housing, and resilient means tending to guide the said catch bolt along the said guide member during movement of the said catch bolt.

3. The device, as set forth in claim 2, in which the said coupling device includes a coupling lever disposed within the said drum and adjacent the said drive gear, the said drum has on its periphery a spiral groove for receiving the said cable, and the said drum has a slot through its wall opposite to the back portion of the said coupling lever, the said slot being of a width equal with that of the said groove, the back portion of the said coupling lever being received by the said slot, a coupling bolt secured to said drive gear, and the said coupling lever having a notch to receive therein the said coupling bolt secured to the said drive gear.

4. The device, as set forth in claim 1, in which the said coupling device includes a locking member disposed within the said drum and adapted to retain the said coupling device in coupling position in case of jamming of the sliding roof.

5. The device, as set forth in claim 4, in which the said locking member comprises a tongue rotatably mounted in the said drum, and the wall of the latter has a slot disposed opposite the said tongue and of a width equal to that of a cable groove on the said drum, the said slot being adapted to receive the said tongue and to render inoperative the said coupling device upon projection of the said tongue through the said slot beyond the periphery of the said drum.

6. The device, as set forth in claim 5, in which the said coupling device includes a coupling lever disposed within the said drum, in addition to said locking member, and the said tongue has a notch, and a double-armed lever is freely rotatable within the said drum, one end of the said double-armed lever being received by the said notch of the said tongue in the operative position of the said coupling device, the other end of the said double-armed lever being connected with the said coupling lever by means of a knee-joint connection, and resilient means on the said other end of the said double-armed lever for shifting the said coupling device into operative coupling position.

7. The device, as set forth in claim 6, in which the said coupling lever has a guide member, the said driving member comprises a drive gear, and a coupling bolt is secured to the said drive gear, and the said guide member is adapted to engage the said coupling bolt during turning of the said drive gear.

8. The device, as set forth in claim 7, which includes an additional bolt freely rotatably disposed within the said drum for securing the end of the said cable, and precharged spring means secured to the said additional bolt for retaining the said cable in tensed condition.

References Cited in the file of this patent

UNITED STATES PATENTS

| | | |
|---|---|---|
| 1,395,129 | McCorrkindale | Oct. 25, 1921 |
| 1,917,695 | Brinvilliers | July 11, 1933 |
| 1,939,195 | Baier | Dec. 12, 1933 |
| 1,969,595 | D'Ornellas | Aug. 7, 1934 |
| 2,509,623 | Baade | May 30, 1950 |